COLOR TELEVISION RECEIVER MATRIX

Filed Sept. 21, 1955 4 Sheets-Sheet 1

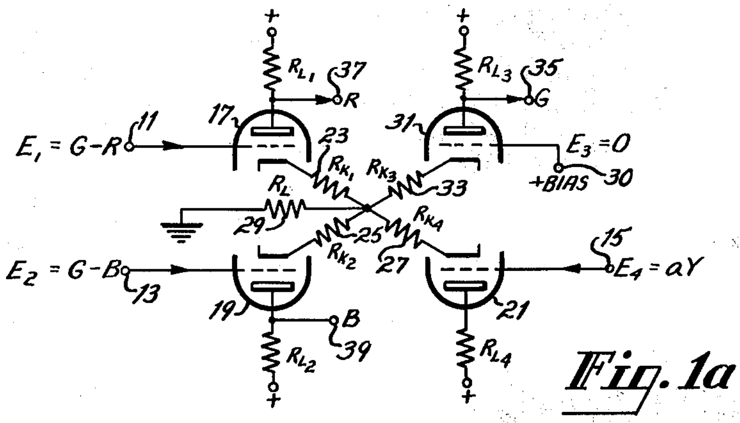

Fig. 1a

Fig. 1b (1) $E_1 = G-R$ (2) $E_2 = G-B$ (3) $E_3 = 0$ (4) $E_4 = aY$ (5) $E_c = G$ (6) $K = \frac{g_m r_p}{r_p + R_L + g_m r_p R_K} = \frac{\mu}{r_p + R_L + \mu R_K}$ (7) $I_1 = -K_1 R$ (8) $I_2 = -K_2 B$ (9) $I_3 = -K_3 G$

(10) $I_4 = K_4(aY-G)$

(11) $[I_1 + I_2 + I_3 + I_4] R_C = G$

(12) $-K_1 R - K_2 B - K_3 G + K_4 aY - K_4 G = \frac{G}{R_C}$

(13) $(-K_1 + 0.30 K_4 a) R + (-K_2 + 0.11 K_4 a) B + (-K_3 + 0.59 a K_4 - K_4) G = \frac{G}{R_C}$

(14) $K_1 = 0.30 K_4 a$

(15) $K_2 = 0.11 K_4 a$

(16) $(0.59a - 1) K_4 - K_3 = \frac{1}{R_C}$

(17) $K_3 = (0.59a - 1) K_4 - \frac{1}{R_C}$

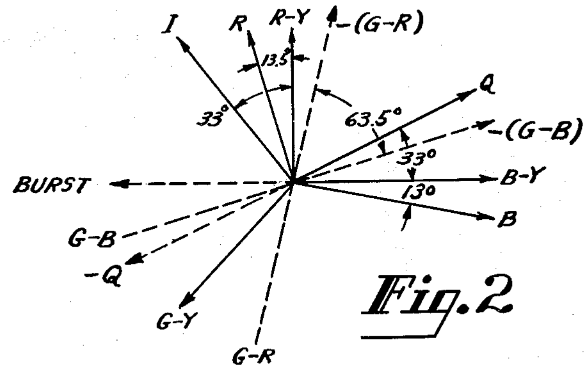

Fig. 2

INVENTORS
DALTON H. PRITCHARD &
ALFRED C. SCHROEDER
BY
ATTORNEY

April 18, 1961 D. H. PRITCHARD ET AL 2,980,761

COLOR TELEVISION RECEIVER MATRIX

Filed Sept. 21, 1955 4 Sheets-Sheet 2

INVENTORS
DALTON H. PRITCHARD &
ALFRED C. SCHROEDER
BY
ATTORNEY

INVENTORS
DALTON H. PRITCHARD &
ALFRED C. SCHROEDER
BY
ATTORNEY

April 18, 1961 D. H. PRITCHARD ET AL 2,980,761

COLOR TELEVISION RECEIVER MATRIX

Filed Sept. 21, 1955 4 Sheets-Sheet 4

INVENTORS
DALTON H. PRITCHARD &
ALFRED C. SCHROEDER
BY [signature]
ATTORNEY

United States Patent Office 2,980,761

Patented Apr. 18, 1961

2,980,761

COLOR TELEVISION RECEIVER MATRIX

Dalton Harold Pritchard, Princeton, N.J., and Alfred C. Schroeder, Huntingdon Valley, Pa., assignors to Radio Corporation of America, a corporation of Delaware Filed Sept. 21, 1955, Ser. No. 535,701

3 Claims. (Cl. 178—5.4)

The present invention relates to signal matrixing circuits and particularly to an improved circuit for developing component color signals from luminance and color difference signals in a color television receiver.

The color television signal conforming to standards adopted by the Federal Communications Commission includes both a luminance signal and a chrominance signal. The luminance signal is a signal relating to the monochrome information in a transmitted image. The chrominance signal is a modulated subcarrier containing modulations related to color difference signals, each of which describes how that color differs from the brightness and color content relating to that color in the luminance signal. Each phase of the chrominance signal is related to a particular hue. The amplitude of the chrominance signal component at that phase is related to the saturation of that hue when taken into consideration with the corresponding luminance signal information. A color difference signal added to the luminance signal yields a component color signal corresponding to that color difference signal.

In many color television receivers, the color difference signals and the luminance signal are individually demodulated and then added in adder circuits or at the kinescope to form component color signals. Such circuits require amplifier circuits for both luminance and color difference signal information.

It is an object of this invention to provide an improved matrix circuit for developing component color signals from both the luminance and color difference signals in a color television receiver.

It is another object of this invention to provide a circuit driven by a luminance signal and a pair of color difference signals for providing a trio of component color signals.

It is a further object of this invention to provide a luminance fed matrix circuit presenting a low impedance to the luminance signal.

It is a still further object of this invention to provide an improved matrix circuit, driven by luminance and color difference signals, for producing high definition component color signals.

According to the invention a pair of color difference signals and a luminance signal are applied to an impedance coupled mixing circuit or matrix capable of developing prescribed amplitudes and polarities of each of the color difference signals and adding them to the luminance signal to provide a trio of component color signals.

In one form of the present invention, a plurality of electron control devices have a common cathode circuit. The luminance signal is fed to the common cathode circuit. A pair of color difference signals, having a phase difference in the chrominance signal of 63.5° are applied to control grids of selected electron control devices. The transconductance of the control devices is thereupon adjusted to cause a green component signal to be developed across the common cathode circuit and to cause red and blue component color signals to be developed in the outputs of the electron control devices.

In another form of the present invention, selected color difference signal components of one of the aforementioned pair of color difference signals are fed to the common cathode circuit. These signal components cancel corresponding selected higher frequency components of the other color difference signal of said aforementioned pair in the common cathode circuit. This causes each of the component color signals to have the full color definition inherent in the chrominance signal.

Other and incidental objetcs of this invention will become apparent upon a reading of the specification and a study of the drawings, wherein:

Figure 1A is a schematic diagram of the present invention.

Figure 1B relates to equations describing the operation of the circuit of Figure 1A.

Figure 2 is a vector diagram illustrating the angles of pertinent color difference signals in the chrominance signal.

Figure 3:
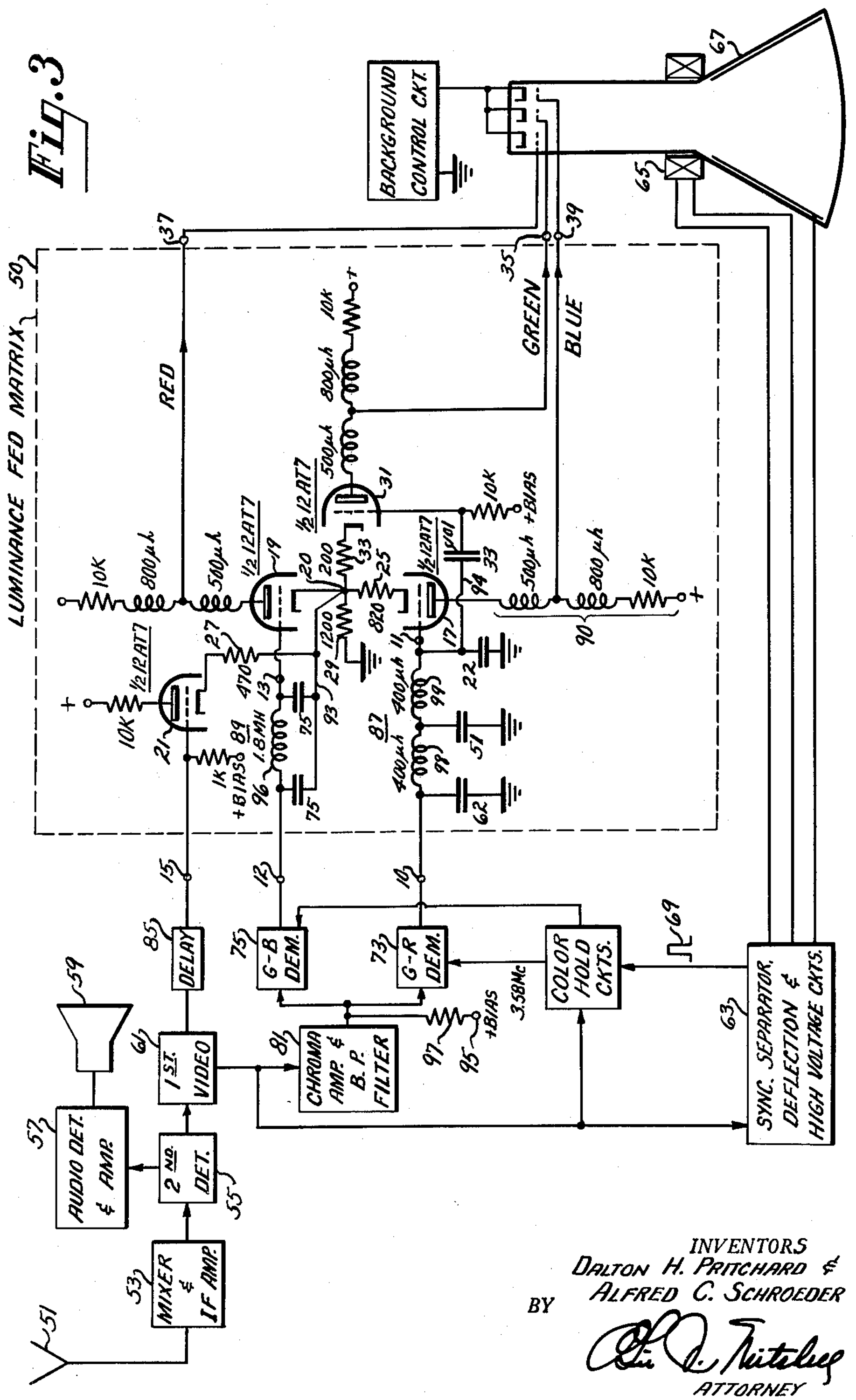
Figure 3 is a diagram of a color television receiver utilizing one form of the present invention.

The present invention provides means for combining the luminance and color difference signals in a matrix circuit for obtaining red, green and blue component color signals at appropriate amplitude levels for direct coupling to the control elements of a color image reproducer. It may be used in a color television receiver or monitor unit and will be seen to be a circuit capable of D.-C. coupling and wide bandwidth color edge definition.

The circuit of Figure 1A is a schematic diagram of one form of the present invention. This circuit consists of a four-tube network having common cathode connections, three input terminals and three output terminals. Color difference signals $E_1$ and $E_2$ are applied respectively to the input terminals 11 and 13 with a luminance signal applied to the input terminal 15. Terminals 11, 13 and 15 are coupled to the control grids respectively of tubes 17, 19 and 21. The cathodes of tubes 17, 19 and 21 are coupled to a common terminal 20 by way of resistors 23, 25 and 27 respectively. A cathode resistor 29, functioning as an impedance coupling parameter, is coupled between the common terminal 20 and ground. The cathode of tube 31 is coupled to the common terminal 20 by way of the resistance 33. Any signals developed at the common terminal 20 will thereby be caused to cathode-drive the tube 31 to develop an amplified signal which will appear at the output terminal 35 of tube 31. Signals developed in tubes 17, 19 will be provided respectively at the output terminals 37 and 39. It is noted from the circuit of Figure 1 that the control grid of tube 31 is held at a fixed bias.

The equations which describe the operation of the circuit of Figure 1A are listed in Figure 1B. Before discussing these equations and deriving therefrom a detailed understanding of the operation of the circuit of Figure 1A, consider first a more general discussion of this operation. The luminance signal, which is applied to the control grid of tube 21, is caused to develop the luminance signal across the cathode resistor 29. The luminance signal will thereupon be developed in the outputs of each of the tubes 17, 19 and 31 at amplitude levels dependent upon the load resistors of these tubes and the resistors 23, 25 and 33.

A pair of demodulated color difference signals denoted as *G—R* and *G—B* signals are demodulated from the chrominance signal. The phases of the color difference signals *G—R* and *G—B* are shown in Figure 2 where it is seen that *G—B* leads the burst phase by 13.5° with the *G—R* signal leading the *G—B* signal by 63.5°.

With the *G—R* signal applied to the control grid of tube 17 and the $G-B$ signal applied to the control grid of tube 19, a resultant signal representing positive amplitudes of these signals will be developed across the cathode resistor 29. The vector resultant of the $G-B$ and $G-R$ signals will yield the $G-Y$ color difference signal shown in Figure 2. This $G-Y$ color difference signal developed across the cathode resistor 29 will cathode-drive tube 31 to produce an amplified $G-Y$ signal at the output terminal 35. Since a luminance signal is already developed there due to the action of luminance signal driving tube 21 by way of the cathode resistor 29, the luminance or Y signal will add to the $G-Y$ signal at terminal 35 to produce the G or green signal. Tubes 17 and 19 may be considered to be a pair of cathode-coupled phase splitters. The $G-R$ signal applied to the control grid of tube 17 will be produced in the same polarity across the cathode resistor 29 and in reversed polarity at the output terminal 37; the $G-R$ signal will thereupon also be produced in the same polarity at the output terminal 39 of tube 19. In like fashion, the $G-B$ signal applied to the control grid of tube 19 will be produced in reversed polarity at the output terminal 39 of tube 19 and in the same polarity across the cathode resistance 29 and at the output terminal 37 of tube 17. By employing resistors 23 and 25 of proper values, the transconductance of the tubes 17 and 19 will assume values suitable to provide amplitudes of Y, $-(G-R)$ and $G-B$ which will form a resultant signal at the output terminal 37, which is the R or red signal. In like fashion, at the output terminal 39 of tube 19, the Y, $-(G-B)$ and a $G-R$ signal will form a resultant signal which is the B or blue signal.

The equations describing the operation of the circuit of Figure 1A are listed in Figure 1B. Equations 1 through 5 prescribe the nature and the magnitudes of the voltages $E_1$, $E_2$, $E_3$ and $E_4$ which are applied to the terminals 11, 13, 30 and 15. $E_c$ is specified, as shown by Equation 5, to be the green signal or G. An amplification factor $k$ is described in Equation 6 for each of the tubes involved. It is seen that this amplification factor is described in terms of the effective mutual transconductance, the plate resistance, the load resistance and the resistance coupled from the cathode of that tube to the common terminal 20. The effective transconductance is described by the relationship $$\frac{G_{m_1}}{1+\frac{R_1}{R_k}}$$

where $G_{m_1}$ is the rated transconductance.

The currents through each of tubes 17, 19, 31 and 21, namely, $I_1$, $I_2$, $I_3$ and $I_4$ are prescribed by Equations 7 through 10. Equation 11 shows that the sum of each of these four currents multiplied by the magnitude of the cathode resistance 29, namely $R_c$, must be equal to the magnitude of the green signal, namely G. Expressions relating $k_1$, $k_2$, $k_3$ and $k_4$ based on the parameters of this system are listed in Equations 12 through 17. Solution of these equations in terms of the amplitude $a$ of the luminance signal and the magnitude of the cathode resistance 29 will show that these equations will be satisfied to yield red, green and blue information signals at the output terminals 37, 39 and 35, respectively when $E_1$ and $E_2$ are the $G-R$ and $G-B$ signals, respectively shown in Figure 2. It is to be appreciated that the terminology $G-B$ or $G-R$ arises from the fact that the $G-B$ signal is 90° off the R signal while the $G-R$ signal is 90° off the B signal of the vector diagram of Figure 2.

Figure 3 is a block diagram of a color television receiver including a schematic diagram of one form of the present invention. Hereinafter in this application, matrix circuits of the type employing the present invention will be referred to as a luminance-fed matrix. The luminance-fed matrix of Figure 3 is assigned the numeral 50.

In the circuit of Figure 3, the incoming signal is received at the antenna 51, passed through a mixer and IF amplifier 53 and applied to the second detector 55.

The sound information which accompanies the color television signal may be demodulated by use of an inter-carrier sound circuit. Typically, the sound information is detected and amplified in the audio detector and amplifier 57 and applied to the loud speaker 59. The demodulated color television signal which includes picture synchronizing signals, luminance and chrominance signals and the color synchronizing bursts are applied from the second detector 55 to the first video amplifier 61.

The output of the first video amplifier 61 is applied to the sync separator, deflection and high voltage circuits 63 which supply deflection signals to the deflection yokes 65 and a high voltage to the ultor of the color kinescope 67. In addition, the sync separator, deflection and high voltage circuits supply a gate pulse 69 to the color hold circuit 71. The gate pulse 69 has a duration interval at least that of the color synchronizing bursts.

Figure 5:
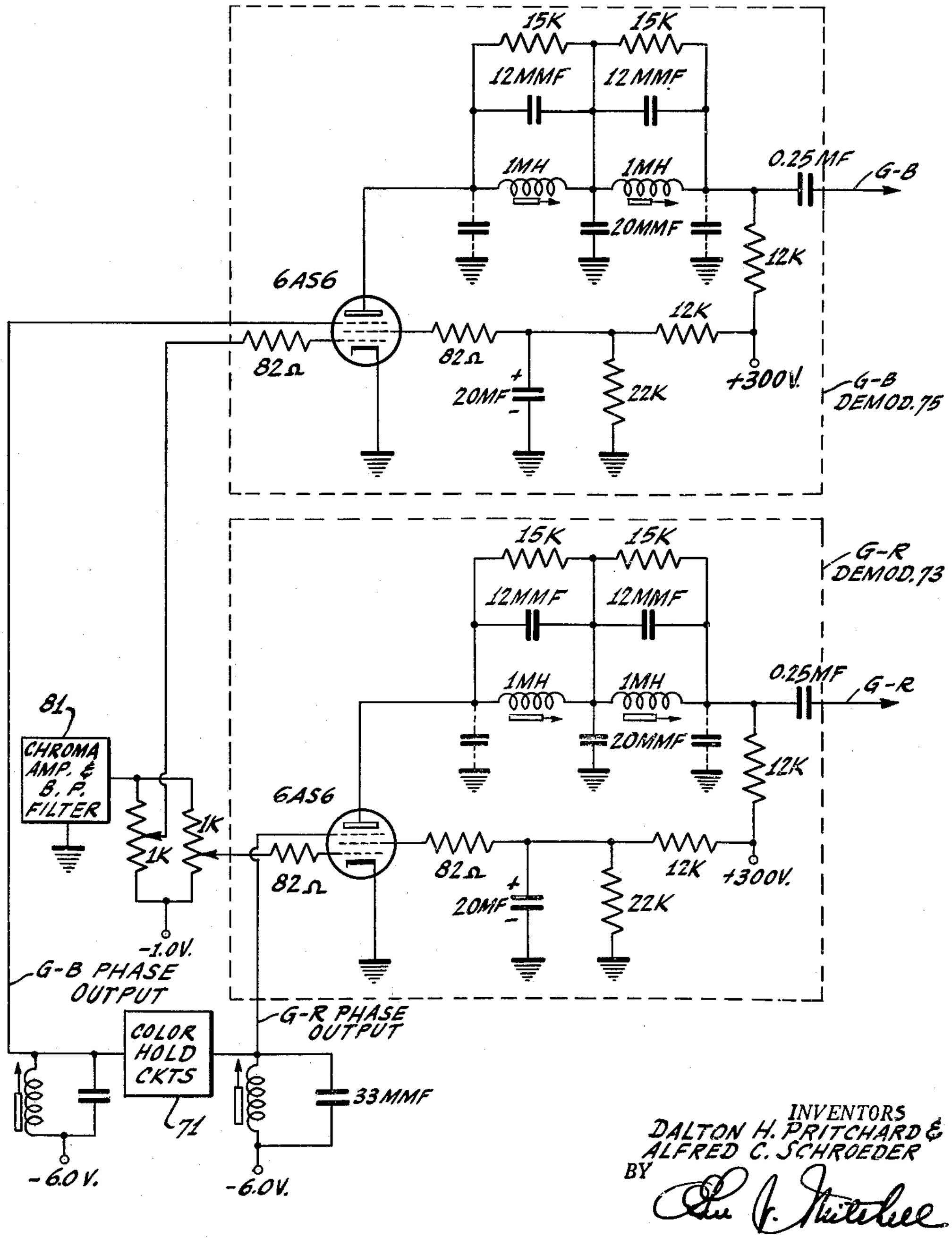
Figure 5 illustrates schematically a representative form which the color demodulators of Figure 3 may take.

The color television signal and the gate pulse 69 are applied to the color hold circuit 71 which separates the color synchronizing bursts from the color television signal and develops a synchronous demodulating signal whose phase and frequency are accurately synchronized to the phase and frequency of the color synchronizing bursts. The color hold circuit 71 thereupon applies a $G-R$ phased demodulating signal to the $G-R$ demodulator 73 and a $G-B$ phased demodulating signal to the $G-B$ demodulator 75. For details of operation of typical demodulator circuits, see, for example, the paper by Pritchard and Rhodes, entitled, "Color Television Signal Receiver Demodulators" which was published in the June 1953 issue of the RCA Review. In Figure 5, an illustrative example of a specific form which the demodulators 73 and 75 may take is shown in schematic detail, the illustrative demodulator circuitry being similar to that shown in Figure 6 of the above-mentioned Pritchard and Rhodes paper.

The color television signal is applied to the chroma amplifier and bandpass filter 81 which selects the chrominance signal from the color television signal and applies the chrominance signal to both the $G-B$ demodulator 75 and the $G-R$ demodulator 73.

The luminance signal is applied from the first video amplifier 61 to the terminal 15 of the luminance-fed matrix 50 by way of the delay line 85. $G-R$ and $G-B$ color difference signals are applied respectively to the terminals 11 and 13 of the luminance-fed matrix by way of the filter circuits 87 and 89. Filter circuits 87 and 89 which both filter and delay the $G-R$ and $G-B$ color difference signals, apply these color difference signals, respectively, to terminals 11 and 13.

The circuit of the luminance-fed matrix 50 is very similar to the circuit of Figure 1 with the exception of the fact that the resistance 25 of circuit of Figure 1 has been omitted. The filters 87 and 89 have been added, and certain connections to yield what will be termed quasi IQ operation to be described in detail, have been added. However, corresponding components and terminals are provided with the same numerals as those utilized in the circuit of Figure 1. Each of the tubes 17, 19 and 31 is provided with an anode circuit of the type coupled, for example, to the anode of tube 19. This anode circuit 90 consists of a pair of inductances having magnitudes of 500 and 800 μh. which are coupled in series with a 10K ohm resistor. The anode circuit 90 and similar anode circuits coupled to the anodes of tubes 19 and 31 provide impedance characteristics suitable for broad banding the operation of the luminance-fed matrix 50; the output component color signals developed at the output terminals 35, 37 and 39 will have a frequency range of from substantially 0 to 4.2 mcs.

Excluding, for the moment, considerations of the design of filters 87 and 89 and the connection 93 which is coupled to the common terminal 20, the luminance-fed matrix 50 will provide red, green and blue component color signals at the output terminals 37, 35 and 39, respectively. For purposes of convenience too, a bias is applied to the terminal 95 to be applied to the control grids of 19 and 17 by way of the resistance 97, the circuits of the *G—B* demodulator 75 and the *G—R* demodulator 73, the inductance 96 of the filter 89, and the inductances 98 and 99 of the filter 87.

The connection from terminal 11 to the control grid of tube 31 by way of condenser 101, and the connection 93 from the condensers of the filter 89 to the common terminal 20 provide performance of the luminance-fed matrix 50 leading to improved utilization of the color information contained in the chrominance signal. This utilization may be understood by the following discussion; the chrominance signal, whose characteristics are illustrated in part by the vector diagram of Figure 2, contains so-called I and Q vectors. The I signal leads the *R—Y* signal by 33° with the Q signal lagging the I signal by 90°. The I signal describes color difference signal information along substantially the orange-cyan color axis in the chromaticity diagram. The I signal, since it pertains to color information for which the eye has high acuity, includes components having frequencies up to 1½ mcs. The Q signal describes color information along what is substantially a green-purple axis in the chromaticity diagram. The Q signal includes components up to ½ mc.; it is to be appreciated that with the exception of the I signal which contains components up to 1½ mcs., color information at any other angle in the chrominance signal is limited to higher frequency components in the vicinity of ½ mc. An extensive discussion of the nature of the color information in the chrominance signal is to be found in the article by Brown entitled "Mathematical Formulations of the NTSC Color Television Signal," published in the January 1954 Proceedings of the I.R.E.

The description of the operation of the circuit of Figure 1 applies to *G—R* and *G—B* information having an upper frequency limit of approximately ½ mc. It is noted from the vector diagram of Figure 2, however, that the *G—B* color difference signal information is very close to the —Q color difference signal information. Color difference signal information developed across the cathode resistance 29 contains lower frequency color difference signal information from 0 to ½ mc. and also I and Q information in the higher frequency range from ½ to 1½ mcs. The developing of —Q color difference signal information across the cathode resistance 29 will cancel the +Q information in this higher frequency range leaving substantially the I color difference signal information which will thereupon be developed in proper proportions and polarities at the output terminals 37, 35 and 39 to provide the higher frequency components of red, green and blue component color signals.

The red, green and blue component color signals have very high frequency components up to 4.2 mcs. as derived from the luminance signal; the higher frequency components derived from the high frequency region of the I signal will produce components in the aforementioned component color signals up to 1½ mcs.

Filter 87 is caused to function as a low pass filter having a cutoff frequency high enough so that color information up to 1½ mcs., developed at terminal 11, is applied to both the control grid of the tube 17, and, by way of connection 94, to the control grid of tube 31. The *G—R* signal thereupon developed at the common terminal 20 and therefore across the cathode resistance 29, is a high frequency signal containing I components and cross-talk from the Q color difference signal in the higher frequency ranges. The luminance-fed matrix 50 functions in accordance with what is termed quasi IQ operation, that is to say, to include high frequency I color difference signal components in the output signals.

The filter 89 performs two functions. It acts as a low pass filter having a cutoff frequency at approximately ½ mc. The filtered *G—B* signal is thereupon applied to the control grid of tube 19. The connection 93, however, provides that at least the higher frequency components of the *G—B* signal will pass to the common connection 20 thereby applying what is, for all practical purposes, —Q color difference signal information at least in the higher frequency range from ½ to 1½ mcs. to this point. The higher frequency range —G signal information supplied from the *G—B* demodulator 75 by way of connection 93 to the cathode resistance 29 performs the function of cancelling any cross-talk color difference signal information from the so-called higher frequency Q component of the *G—R* signal leaving principally higher frequency I color difference information in the frequency range from ½ to 1½ mcs. to furnish higher frequency color components to the red, green and blue component color signals in the manner previously described.

Figure 4:
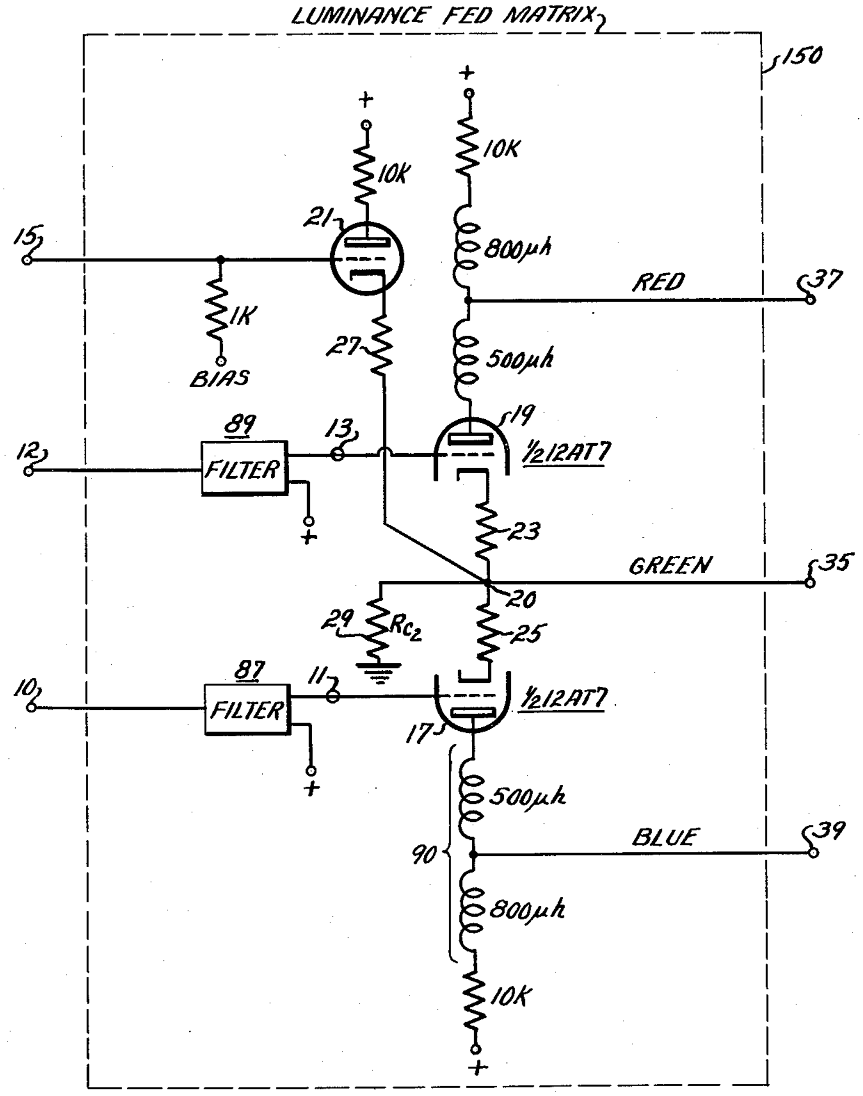
Figure 4 is a schematic diagram of another form of the present invention.

Figure 4 is a schematic diagram of a luminance-fed matrix bearing the numeral 150 to distinguish it over the luminance-fed matrix of Figure 3. The luminance-fed matrix 150 utilizes the tubes 21, 17 and 19 of the luminance-fed matrix 50. The cathode resistance 29 is, however, made of sufficient magnitude so that a green signal of large magnitude is developed directly at the common terminal 20 and therefore at the output terminal 35. The general performance of the luminance-fed matrix 150 may be deduced by solving the equations listed in Figure 1B for the case where $I_3$ is equal to 0.

The amplification factors of tubes 17 and 19 are adjusted so that the red and blue component color signals presented at the output terminals 37 and 39, respectively, are of proper magnitude with respect to the magnitude of the green component signal at the output terminal 35. The performance of the luminance-fed matrix 150 will depend largely upon the magnitude of the cathode resistance 29; the magnitude of this resistance 29 and the amplification factors of the tubes 17 and 19 will determine the amplitude level of the green component color signal and also of the nature of the demodulated color difference signals which are applied to the control grids of the tubes 17 and 19. Except for a narrow range of operating parameters, the color difference signals required from the demodulators of the color television receivers will be at angles other than those corresponding to the *G—B* and *G—R* angles of Figure 2.

The filters 87 and 89 of the luminance-fed matrix 150 are adjusted to provide the required bandwidths and time delays of the particular pair of color difference signals called for by the circuit.

It is to be appreciated that quasi IQ operation of the luminance-fed matrix 150 can be obtained by applying properly phased Q information in the higher frequency range to the common terminal 20. This properly phased Q information may be derived either from a separate demodulator or from one or both of the filters 87 and 89 depending upon the precise nature of the color difference signals applied to terminals 10 and 12.

In general, elements of the luminance-fed matrix 150 performing similar to elements of the luminance-fed matrix 50 have the same numerals.

What is claimed is:

1. In a color television receiver adapted to derive from received composite color television signals a luminance signal component and a chrominance signal component, said chrominance signal component comprising phase and amplitude modulated color subcarrier waves, apparatus for forming three separate primary color signals from the components of said received signals, said apparatus comprising first color demodulator means for heterodyning said chrominance signal component with color subcarrier frequency oscillations of a first predetermined phase to develop a first color difference signal representative of the difference between a first one of said primary color signals and a second one of said primary color signals; second color demodulator means for heterodyning said chrominance signal component with color subcarrier frequency oscillations of a second predetermined phase to develop a second color difference signal representative of the difference between said first primary color signal and a third one of said primary color signals; first, second, third and fourth amplifier devices each having an input electrode, an output electrode and a common electrode; means for maintaining the input electrode of said first amplifying device at a relatively fixed reference potential; means for applying a predetermined combination of said first color difference signal, said second color difference signal, and said luminance signal component to the common electrode of said first amplifying device, the relative proportions of said first color difference signal, said second color difference signal and said luminance signal component in said predetermned combination being such as to render said predetermined combination of signals representative of substantially exclusively said first-named primary color, whereby said first primary color signal appears at the output electrode of said first amplifier device; said signal combination applying means comprising a first impedance coupled between the common electrode of said first amplifier device and a point of reference potential, and means for developing said predetermined combination of signals across said first impedance; said last-named developing means including a respective coupling between the common electrode of each of said second, third and fourth amplifier devices and said first impedance, means coupled to said first color demodulator means for applying said first color difference signal to the input electrode of said second amplifier device, means coupled to said second color demodulator means for applying said second color difference signal to the input electrode of said third amplifier device, and means for applying said luminance signal component to the input electrode of said fourth amplifier device; means for causing the signal developed at the output electrode of said second amplifier device in response to the first color difference signal applied to its input electrode and to the additional signals applied to its common electrode via the coupling between said common electrode and said first impedance to be representative substantially exclusively of said second primary color, said causing means comprising a second impedance included in the coupling of the common electrode of said second amplifier device to said first impedance, the impedance value of said second impedance bearing a first predetermined ratio to the impedance value of the first impedance; and means for causing the signal developed at the output electrode of said third amplifier device in response to the second color difference signal applied to its input electrode and to the additional signals applied to its common electrode via the coupling of said common electrode to said first impedance to be representative substantially exclusively of said third primary color, said last-named causing means comprising a third impedance included in the coupling of the common electrode of said third amplifier device to said first impedance, the impedance value of said third impedance bearing a second predetermined ratio, different from said first predetermined ratio, to the impedance value of said first impedance.

2. In a color television receiver adapted to derive from received composite color television signals a luminance signal component and a chrominance signal component, said chrominance signal component comprising phase and amplitude modulated color subcarrier waves, apparatus for forming separate green, blue and red component color signals from the components of said received signals, said apparatus comprising first color demodulator means for heterodyning said chrominance signal component with color subcarrier frequency oscillations of a first predetermined phase to develop a first color difference signal representative of the difference between said green color signal and said blue color signal; second color demodulator means for heterodyning said chrominance signal component with color subcarrier frequency oscillations of a second predetermined phase to develop a second color difference signal representative of the difference between said green color signal and said red color signal; first, second, third and fourth amplifier devices each having a control grid, cathode, and anode; means for maintaining the control grid of said first amplifying device at a relatively fixed reference potential; means for applying a predetermined combination of said first color difference signal, said second color difference signal, and said luminance signal component to the cathode of said first amplifying device, the relative proportions of said first color difference signal, said second color difference signal and said luminance signal component in said predetermined combination being such as to render said predetermined combination of signals representative of substantially exclusively said first-named primary color, whereby said green color signal appears at the anode of said first amplifier device; said signal combination applying means comprising a first impedance coupled between the cathode of said first amplifier device and a point of reference potential, and means for developing said predetermined combination of signals across said first impedance; said last-named developing means including a respective coupling between the cathode of each of said second, third and fourth amplifier devices and said first impedance, means coupled to said first color demodulator means for applying said first color difference signal to the control grid of said second amplifier device, means coupled to said second color demodulator means for applying said second color difference signal to the control grid of said third amplifier device, and means for applying said luminance signal component to the control grid of said fourth amplifier device; means for causing the signal developed at the anode of said second amplifier device in response to the first color difference signal applied to its control grid and to the additional signals applied to its cathode via the coupling between said cathode and said first impedance to be representative substantially exclusively of said blue color, said causing means comprising a second impedance included in the coupling of the cathode of said second amplifier device to said first impedance, the impedance value of said second impedance bearing a first predetermined ratio to the impedance value of the first impedance; and means for causing the signal developed at the anode of said third amplifier device in response to the second color difference signal applied to its control grid and to the additional signals applied to its cathode via the coupling of said cathode to said first impedance to be representative substantially exclusively of said red color, said last-named causing means comprising a third impedance included in the coupling of the cathode of said third amplifier device to said first impedance, the impedance value of said third impedance bearing a second predetermined ratio, different from said first predetermined ratio, to the impedance value of said first impedance.

3. In a color television receiver adapted to derive from received composite color television signals a luminance signal component and a chrominance signal component, said chrominance signal component comprising phase and amplitude modulated color subcarrier waves, apparatus for forming three separate primary color signals from the components of said received signals, said apparatus comprising first color demodulator means for heterodyning said chrominance signal component with color subcarrier frequency oscillations of a first predetermined phase to develop a first color difference signal representative of the difference between a first one of said primary color signals and a second one of said primary color signals; second color demodulator means for heterodyning said chrominance signal component with color subcarrier frequency oscillations of a second predetermined phase to develop a second color difference signal representative of the difference between said first primary color signal and a third one of said primary color signals; first, second, third and fourth amplifier devices each having an input electrode, an output electrode and a common electrode; means for maintaining the input electrode of said first amplifying device at a relatively fixed reference potential; means for applying a predetermined combination of said first color difference signal, said second color difference signal, and said luminance signal component to the common electrode of said first amplifying device, the relative proportions of said first color difference signal, said second color difference signal and said luminance signal component in said predetermined combination being such as to render said predetermined combination of signals representative of substantially exclusively said first-named primary color, whereby said first primary color signal appears at the output electrode of said first amplifier device; said signal combination applying means comprising a first impedance coupled between the common electrode of said first amplifier device and a point of reference potential, and means for developing said predetermined combination of signals across said first impedance; said last-named developing means including a respective coupling between the common electrode of each of said second, third and fourth amplifier devices and said first impedance, means coupled to said first color demodulator means for applying said first color difference signal to the input electrode of said second amplifier device, means coupled to said second color demodulator means for applying said second color difference signal to the input electrode of said third amplifier device, and means for applying said luminance signal component to the input electrode of said fourth amplifier device; means for causing the signals developed at the output electrode of said second amplifier device and at the output electrode of said third amplifier device to be representative substantially exclusively of said second primary color, and said third primary color, respectively; said causing means comprising means providing an additional impedance in the coupling of the common electrode of at least one of said second and third amplifier devices to said first impedance, said additional impedance providing means causing the ratio of said first impedance to the impedance presented by the coupling of the common electrode of said second amplifier device thereto to differ from the ratio of said first impedance to the impedance presented by the coupling of the common electrode of said third amplifier device thereto.

References Cited in the file of this patent

UNITED STATES PATENTS

| | | |
|---|---|---|
| 2,732,425 | Pritchard | Jan. 24, 1956 |
| 2,807,661 | Espenlaub et al. | Sept. 24, 1957 |
| 2,830,112 | Pritchard | Apr. 8, 1958 |
| 2,845,481 | Lockhart | July 29, 1958 |

OTHER REFERENCES

RCA Model 21–CT–66IU, Chassis No. CTC4, Service data 1955, No. T5; first printing May 4, 1955.